(12) United States Patent
Cheng et al.

(10) Patent No.: US 10,938,065 B2
(45) Date of Patent: Mar. 2, 2021

(54) POLYMER ELECTROLYTE MEMBRANE AND METHOD FOR PREPARING SAME

(71) Applicant: Shanghai Energy New Materials Technology Co., Ltd., Shanghai (CN)

(72) Inventors: Alex Cheng, Shanghai (CN); Honggui Deng, Shanghai (CN); Lei Xiong, Shanghai (CN); Lihua Wang, Shanghai (CN); Fangbo He, Shanghai (CN); Weiqiang Wang, Shanghai (CN)

(73) Assignee: Shanghai Energy New Materials Technology Co., Ltd., Shanghai (CN)

( * ) Notice: Subject to any disclaimer, the term of this patent is extended or adjusted under 35 U.S.C. 154(b) by 111 days.

(21) Appl. No.: 16/307,283

(22) PCT Filed: Apr. 12, 2017

(86) PCT No.: PCT/CN2017/080247
§ 371 (c)(1),
(2) Date: Dec. 5, 2018

(87) PCT Pub. No.: WO2017/211126
PCT Pub. Date: Dec. 14, 2017

(65) Prior Publication Data
US 2019/0140319 A1    May 9, 2019

(30) Foreign Application Priority Data
Jun. 7, 2016 (CN) .......................... 201610398348.X

(51) Int. Cl.
| | | |
|---|---|---|
| *H01M 10/0565* | (2010.01) | |
| *C08J 5/18* | (2006.01) | |
| *H01M 10/052* | (2010.01) | |
| *H01M 10/0525* | (2010.01) | |
| *H01M 10/0568* | (2010.01) | |

(52) U.S. Cl.
CPC .......... *H01M 10/0565* (2013.01); *C08J 5/18* (2013.01); *H01M 10/052* (2013.01); *H01M 10/0525* (2013.01); *H01M 10/0568* (2013.01); *H01M 2300/0028* (2013.01); *H01M 2300/0082* (2013.01)

(58) Field of Classification Search
CPC ......... H01M 10/0565; H01M 10/0525; H01M 10/0568; H01M 2/162; H01M 2/1653; H01M 10/052; H01M 2/1633; H01M 2/145; H01M 2300/0082; H01M 2300/0028; C08J 5/22; C08J 5/2237; C08J 2327/16; C08J 5/18; C08K 3/34; C08K 7/26; C08L 27/16; C08L 33/12
See application file for complete search history.

(56) References Cited

U.S. PATENT DOCUMENTS

| | | | | |
|---|---|---|---|---|
| 2004/0048129 | A1* | 3/2004 | Taft, III | B01D 67/0079 521/27 |
| 2006/0267235 | A1* | 11/2006 | Ma | B29C 70/60 264/105 |
| 2006/0292415 | A1* | 12/2006 | Song | H01M 8/1044 429/483 |
| 2007/0241475 | A1* | 10/2007 | Ma | H01M 8/0213 264/105 |
| 2009/0004529 | A1* | 1/2009 | Gur | H01M 8/04007 429/425 |
| 2014/0038025 | A1* | 2/2014 | Ha | H01M 10/0525 429/144 |
| 2015/0140440 | A1 | 5/2015 | Zhou et al. | |
| 2015/0372269 | A1* | 12/2015 | Sato | H01M 2/145 429/249 |
| 2016/0006009 | A1* | 1/2016 | Kim | C08J 5/18 429/246 |

FOREIGN PATENT DOCUMENTS

| | | | |
|---|---|---|---|
| CN | 1715327 | A | 1/2006 |
| CN | 101153084 | A | 4/2008 |
| CN | 101552359 | | * 10/2009 |
| CN | 101552359 | A | 10/2009 |
| CN | 102005609 | A | 4/2011 |
| CN | 102983357 | | * 3/2013 |
| CN | 102983357 | A | 3/2013 |
| CN | 103450498 | A | 12/2013 |
| CN | 103665678 | A | 3/2014 |
| CN | 103834153 | A | 6/2014 |
| CN | 104140545 | A | 11/2014 |

(Continued)

OTHER PUBLICATIONS

Nunes-Pereira et al. Microporous membranes of NaY zeolite/poly(vinylidene fluoride-trifluoroethylene) for Li-ion battery separators, Journal of Electroanalytical Chemistry 689 (2013) 223-232 (Year: 2013).*

Kongkachuichay et. al.Chemical Engineering Research and Design (2010), 88(4), 496-500 (Abstract) (Year: 2010).*

English language abstract and machine-assisted English language translation for CN101153084 extracted from espacenet.com database on Dec. 13, 2018, 10 pages.

English language abstract and machine-assisted English language translation for CN 102005609 extracted from espacenet.com database on Dec. 13, 2018, 34 pages.

English language abstract and machine-assisted English language translation for CN 103450498 extracted from espacenet.com database on Dec. 13, 2018, 18 pages.

(Continued)

*Primary Examiner* — Alexander Usyatinsky
(74) *Attorney, Agent, or Firm* — Howard & Howard Attorneys PLLC

(57) ABSTRACT

The invention discloses a polymer electrolyte membrane and a method for preparing the same. The method comprises the steps of: (1) mixing a molecular sieve material, a polymer and a solvent to obtain a slurry; (2) coating the slurry on a base membrane to form a wet membrane; (3) drying the wet membrane to obtain a dry membrane; and (4) immersing the dry membrane in a lithium salt electrolyte solution, and taking out to obtain a polymer electrolyte membrane.

6 Claims, No Drawings

(56) References Cited

FOREIGN PATENT DOCUMENTS

| CN | 10417773 | * | 12/2014 |
| CN | 104177738 A | | 12/2014 |
| WO | 0199220 A1 | | 12/2001 |
| WO | 2014000247 A1 | | 1/2014 |

OTHER PUBLICATIONS

English language abstract and machine-assisted English translation for CN 103665678 extracted from espacenet.com database on Dec. 13, 2018, 25 pages.

English language abstract and machine-assisted English translation for CN 103834153 extracted from espacenet.com database on Dec. 13, 2018, 12 pages.

English language abstract and machine-assisted English translation for CN 104140545 extracted from espacenet.com database on Dec. 13, 2018, 14 pages.

English language abstract for WO 2014/000247 extracted from espacenet.com database on Dec. 13, 2018, 2 pages.

International Search Report for Application No. PCT/CN2017/080247 dated Dec. 13, 2018, 5 pages.

Lopes, A.C. et al., "Effect of Zeolite Content in the Electrical, Mechanical and Thermal Degradation Response of Poly(Vinylidene Fluoride)/NaY Zeolite Composites", Journal of Nanoscience and Nanotechnoloty, vol. 12, No. 8, Aug. 1, 2012, pp. 6804-6810.

Nunes-Pereira, J. et al., "Microporous Membranes of NaY Zeolite/Poly(Vinylidene Fluoride-Trifluoroethylene) for Li-ion Battery Separators", Journal of Electroanalytical Chemistry, vol. 689, Nov. 24, 2012, pp. 223-232.

Song, J. et al., "Review of Gel-Type Polymer Electrolytes for Lithium-Ion Batteries", Journal of Power Sources, vol. 77, No. 2, Feb. 1, 1999, pp. 183-197.

Wei, Xiao et al., "Properties on Novel PVDF-HFP-based Composite Polymer Electrolyte with Vinyltrimethoxylsilane-Modified ZSM-5", Polymer Composites, vol. 33, No. 4, Apr. 1, 2012, pp. 629-635.

English language abstract and machine-assisted English language translation for CN 1715327 extracted from espacenet.com database on Oct. 29, 2020, 9 pages.

English language abstract and machine-assisted English language translation for CN 101552359 extracted from espacenet.com database on Oct. 29, 2020, 7 pages.

English language abstract and machine-assisted English language translation for CN 102983357 extracted from espacenet.com database on Oct. 29, 2020, 6 pages.

English language abstract and machine-assisted English language translation for CN 104177738 extracted from espacenet.com database on Oct. 29, 2020, 13 pages.

English Language Abstract of Chen, Zuofeng et al., "Preparation and Characterization of a Novel Microporous Polymeric Electrolyte", Chinese Science Bulletin, vol. 50, No. 638, 1 page, provided by CCPIT Patent and Trademark Law Office on Oct. 27, 2020.

English language abstract of Zhou, Jing-Tian et al., "A Study on the Preparation and Performance of the Solid Electrolytes of the LiC1/4A Molecular Sieve Series", vol. 27, No. 3, 1 page, provided by CCPIT Patent and Trademark Law Office on Oct. 27, 2020.

* cited by examiner

POLYMER ELECTROLYTE MEMBRANE AND METHOD FOR PREPARING SAME

CROSS-REFERENCE TO RELATED APPLICATIONS

The present application is the National Stage of International Patent Application No. PCT/CN2017/080247, filed on Apr. 12, 2017, which claims priority to and all the benefits of Chinese Application No. 201610398348.X, filed on Jun. 7, 2016, which are hereby expressly incorporated herein by reference in their entirety.

TECHNICAL FIELD

The invention relates to a lithium ion secondary battery, particularly to a polymer electrolyte membrane and a method for preparing the same.

BACKGROUND ART

Lithium ion secondary batteries using non-aqueous electrolyte have been widely used in mobile communications, portable computers and various mobile electronic terminals due to their high specific energy. Currently, there are two types of lithium ion batteries, one uses a liquid organic electrolyte, and the other uses a solid or gel polymer electrolyte. The latter lithium ion battery is simple in terms of manufacturing process, has a shape flexibility (variable shape), can be made into a battery with a thickness of less than 1 mm and without liquid leakage, and has a long shell time, etc. In the invention, a lithium ion battery and a metal lithium battery are referred to collectively as a lithium battery. With the development of electric vehicles and power tools, people have put forward higher demand for the performance of lithium-ion batteries, i.e. high energy density, high power, long cycle life, good safety and small size. Obviously, the first generation of liquid lithium ion batteries can no longer meet the demand. In recent years, a new generation of polymer lithium ion secondary batteries has become a research focus in the field of lithium batteries. Polymer electrolytes have the characteristics of light weight, good elasticity, easy film-forming, etc., which are characteristic of polymeric materials, thus conform to the development trend of chemical power supply to some extent, which requires light weight, safety, high-efficiency and environment protection. Thus, polymer electrolytes have become a research and development focus of chemical power supply in recent years.

In prior art, a copolymer of polyvinylidene fluoride (PVDF) and hexafluoropropylene (HFP), and a mixture comprising lithium salt $LiPF_6$, propylene carbonate (PC) and ethylene carbonate (EC) are used to prepare a gel polymer electrolyte membrane. In addition, polyacrylonitrile, polyvinyl chloride, and polyethylene oxides (PEO) colloidal polymer electrolytes are also used in lithium batteries. However, they are poor in conductivity at normal temperature, and are relatively complicated in preparation process or demanding on ambient humidity, and the charge/discharge property of batteries under high current cannot meet the requirements of modern electrical appliances.

Fluorine-containing polymers generally have good mechanical property and electrochemical stability. Currently, the reports on fluorine-containing gel polymer electrolyte mainly use porous polyvinylidene fluoride as a matrix, and the porous electrolyte impregnated with an electrolyte solution has a high charge and discharge rate, and exhibits better electrochemical stability and better mechanical property than porous polyolefin separator; however, it has poor affinity to electrolyte solution, and thus has poor electrolyte absorptivity and poor ion conductivity. Moreover, the electrolyte solution tends to leak during use of the battery.

Therefore, there is an urgent need in the art to provide a technique for preparing a polymer electrolyte material and a membrane thereof which have good electrolyte solution absorptivity and excellent ion conductivity.

SUMMARY OF THE INVENTION

The invention aims to provide a method for preparing a novel polymer electrolyte membrane.

In a first aspect, the invention provides a method for preparing a polymer electrolyte membrane, the method comprising the steps of:

(1) mixing a molecular sieve material, a polymer and a solvent to obtain a slurry;

(2) coating the slurry on a base film to form a wet membrane;

(3) drying the wet membrane to obtain a dry membrane; and (4) immersing the dry membrane in a lithium salt electrolyte solution and taking out to obtain a polymer electrolyte membrane.

In an embodiment, the molecular sieve material is one or more selected from the group consisting of nano 5 A molecular sieve, 10× molecular sieve, and Y-type molecular sieve.

In an embodiment, the weight ratio of the molecular sieve material to the polymer is preferably 1:20 to 1:200, more preferably 1:30 to 1:100, and most preferably 1:40 to 1:60.

In another preferred embodiment, the molecular sieve material is present in an amount of 0.1-3.3 wt % based on the total weight of the slurry obtained in the step (1).

In another preferred embodiment, the polymer is selected from polyvinylidene fluoride (PVDF), poly(vinylidene fluoride-co-hexafluoropropylene) copolymer (P(VDF-HFP)), polymethyl methacrylate (PMMA), or a mixture thereof.

In another preferred embodiment, the polymer is a mixture of poly(vinylidene fluoride-co-hexafluoropropylene) copolymer (P(VDF-HFP)) and polymethyl methacrylate (PMMA), wherein the weight ratio of poly(vinylidene fluoride-co-hexafluoropropylene) copolymer (P(VDF-HFP)): polymethyl methacrylate (PMMA) is 1:0.1 to 1:5, more preferably 1:0.2 to 1:4, and most preferably 1:0.3 to 1:3.

In another preferred embodiment, the solvent is one or more selected from the group consisting of acetone, N-methyl-2-pyrrolidone, N,N-dimethylformamide, N,N-dimethyl acetamide, dimethyl sulfoxide, ethanol, and isopropanol.

In another preferred embodiment, the concentration of the lithium salt solute in the lithium salt electrolyte solution is 0.5-1.5 mol/L; the solute is preferably lithium hexafluorophosphate.

In another preferred embodiment, the solvent of the lithium salt electrolyte solution is ethylene carbonate and dimethyl carbonate, wherein the volume ratio of ethylene carbonate to dimethyl carbonate is 1:1 to 1:2.

In a second aspect, the invention provides a polymer electrolyte membrane comprising a base film layer and a coating layer, the coating layer comprises a molecular sieve material, a polymer, and a lithium salt electrolyte solution. The polymer is selected from polyvinylidene fluoride (PVDF), poly(vinylidene fluoride-co-hexafluoropropylene)

copolymer (P(VDF-HFP)), polymethyl methacrylate (PMMA), or a mixture thereof; and the weight ratio of the molecular sieve material to the polymer is 1:20 to 1:200.

Therefore, the invention provides a technique for preparing a polymer electrolyte material and a membrane thereof which have good liquid absorptivity and excellent ion conductivity.

EMBODIMENTS

The inventors have found through extensive and intensive research that a polymer electrolyte membrane having good liquid absorptivity and excellent ion conductivity can be obtained by using an inorganic compound having a microporous structure (e.g. a molecular sieve material) and a polymer to form a porous membrane, and infiltrating an electrolyte solution into the microporous network of the porous membrane. On such a basis, the invention has been completed.

In the invention, "base film" refers to a PP, PE, or PET base film or a PET nonwoven fabric base film.

PET (Polyethylene terephthalate, chemical formula $COC_6H_4COOCH_2CH_2O$) is a crystalline saturated polyester, which is a milky white or yellowish, highly crystalline polymer with a smooth and shiny surface. Nonwoven fabrics (Non Woven Fabric or Nonwoven Cloth, also nonwovens) are made directly by using polymer chips, short fibers or filaments to form web of fibers mechanically or by passing the fibers through airflow, and then hydroentangled, needled or hot-rolled, and finally conditioned. PET nonwoven fabric is produced by using PET material aggregates as raw materials. The PET material has a tensile strength of 35-52 MPa, a flexural modulus of 200-10343 MPa, a melting point of 254-265° C., a density of 1.27-1.67 g/cm$^3$, and a relative molecular mass of 20000-30000.

PE (polyethylene) is a thermoplastic resin obtained by polymerizing ethylene. Polyethylene is widely used, mainly for the production of thin films and the like. PE material has a tensile strength of 30-42 MPa, a flexural modulus of 500-760 MPa, a melting point of 130-136° C., a density of 0.93-0.96 g/cm$^3$, and a relative molecular mass of 1 million to 4 millions.

PP (polypropylene) is a thermoplastic resin obtained by polymerizing propylene. PP base film is a polypropylene film. PP material has a tensile strength of 21-39 MPa, a flexural modulus of 800 MPa, a melting point of 164-170° C., a density of 0.89-0.91 g/cm$^3$, and a relative molecular mass of 80000-150000.

The molecular sieve material in the invention is selected from the group consisting of nano 5 A molecular sieves, 10× molecular sieves, and Y-type molecular sieves.

5 A molecular sieve is a chemical substance with a molecular formula of $Ca_{34}Na_{28}[(AlO_2)_{96}(SiO_2)_{96}]\cdot 216H_2O$.

10× molecular sieve is a chemical substance with a molecular formula of $Ca_{35}Na_{16}[(AlO_2)_{86}(SiO_2)_{106}]\cdot 264H_2O$.

Y-type molecular sieve is a chemical substance with a molecular formula of $Na_{56}[(AlO_2)_{56}(SiO_2)_{136}]\cdot 264H_2O$.

A method for preparing a polymer electrolyte membrane according to invention comprises the following steps:

Step 1: mixing a molecular sieve material, a polymer and a solvent to obtain a slurry;

Step 2: coating the slurry on a base film to form a wet membrane;

Step 3: drying the wet membrane to obtain a dry membrane; and

Step 4: immersing the dry membrane in a lithium salt electrolyte solution, and taking out to obtain a polymer electrolyte membrane according to the invention.

In above step 1, the weight ratio of the molecular sieve material to the polymer is preferably 1:20 to 1:200, more preferably 1:30 to 1:100, most preferably 1:40 to 1:60; the molecular sieve material is present in an amount of 0.1-3.3% by weight based on the total weight of the slurry.

In an embodiment of the invention, the mixing in above step 1 comprises dissolving a molecular sieve material and a polymer in a solvent and stirring thoroughly to make the resulting slurry uniform.

The molecular sieve material in above step 1 is selected from the group consisting of nano 5 A molecular sieve, 10× molecular sieve, and Y-type molecular sieve.

The polymer in above step 1 is selected from polyvinylidene fluoride (PVDF), poly(vinylidene fluoride-co-hexafluoropropylene) copolymer (P(VDF-HFP)), polymethyl methacrylate (PMMA), or a mixture thereof. The polymer preferably a mixture of poly(vinylidene fluoride-co-hexafluoropropylene) copolymer (P(VDF-HFP))) and polymethyl methacrylate (PMMA), wherein the weight ratio of polyvinylidene fluoride and hexafluoropropylene (P(VDF-HFP)):polymethyl methacrylate (PMMA) is 1:0.1 to 1:5, preferably 1:0.2 to 1:4, more preferably 1:0.3 to 1:3.

The solvent in above step 1 is selected from the group consisting of: acetone, N-methyl-2-pyrrolidone, N,N-dimethylformamide, N,N-dimethyl acetamide, dimethyl sulfoxide, ethanol, and isopropanol. The solvent is preferably N,N-dimethyl acetamide.

The base film in above step 2 includes a PP, PE, PET base film and a PET nonwoven base film; and a PET nonwoven base film is preferred.

In an embodiment of the invention, in above step 3, the wet membrane is dried at 85-95° C. for 10-20 min.

In an embodiment of the invention, in above step 4, the immersion is performed in a dry environment for 25-35 sec.

In a preferred embodiment of the invention, in above step 4, after the membrane is taken out, the liquid on the surface of the membrane is removed.

In above step 4, the concentration of the lithium salt solute in the lithium salt electrolyte solution is 0.5-1.5 mol/L; lithium salt solute is preferably lithium hexafluorophosphate; and the solvent is a mixed solvent of ethylene carbonate (EC) and dimethyl carbonate (DMC).

In a preferred embodiment of the invention, the lithium salt electrolyte solution may be abbreviated as $LiPF_6$/(EC+DMC), wherein EC+DMC represents a mixed solvent of ethylene carbonate and dimethyl carbonate, in which the volume ratio of ethylene carbonate (EC) to dimethyl carbonate (DMC) is 1:1.

The mass fraction of the polymer in the polymer electrolyte membrane obtained by the preparation method of the invention is 30-70%; the polymer electrolyte membrane has an ion conductivity of $1.0 \times 10^{-3}$ S cm$^{-1}$ at 25° C.

The invention also provides the use of a molecular sieve material, together with a polymer, for preparing a polymer electrolyte membrane. The molecular sieve material is one or more selected from the group consisting of nano 5 A molecular sieve, 10× molecular sieve, and Y-type molecular sieve. The polymer is selected from polyvinylidene fluoride (PVDF), poly(vinylidene fluoride-co-hexafluoropropylene) copolymer (P(VDF-HFP)), polymethyl methacrylate (PMMA), or a mixture thereof. The polymer is preferably a mixture of poly(vinylidene fluoride-co-hexafluoropropylene) copolymer (P(VDF-HFP)) and polymethyl methacrylate (PMMA).

The features of present invention mentioned above or the features mentioned in the examples may be used in any combination. All the features described in the specification can be used in combination with any form of composition, and the various features described in the specification can be substituted by any alternative features that provide the same, equal or similar purpose. Therefore, unless otherwise specified, the described features are only general examples of equivalent or similar features.

The main advantages of the invention are as follows:

(1) The polymer electrolyte membrane according to the invention has a strong absorptivity of electrolyte solution and retention ability of electrolyte solution.

(2) The polymer electrolyte membrane according to the invention already comprises electrolyte solutions within the pores of the molecular sieves, and the absorption effect will not lower the lithium ion transport efficiency due to reduction of electrolyte solutions, thus a conductivity comparable to that of a liquid electrolyte can be achieved when a small amount of lithium salt is added to the battery, and thus it is easy to industrialization.

The invention will be further illustrated below in combination with specific examples. It is to be understood that these examples are used only for illustrating the invention but not intended to limit the scope of the invention. The experimental methods in the following examples which do not specify the specific conditions are usually carried out under conventional conditions or the conditions recommended by the manufacturers. All percentages, ratios, proportions, or parts are based on weight, unless otherwise specified. The unit of percent weight in volume in present invention is well known to those skilled in the art and, for example, refers to the weight of the solute in a 100 ml solution. Unless otherwise defined, all the professional and scientific terms used herein have the same meanings as used in the art. In addition, any methods and materials that are similar or equivalent to those described may be employed in the methods of the invention. The preferred embodiments and materials described herein are for illustrative purposes only.

In the following examples and comparative examples, various membrane samples were tested and characterized in terms of properties.

Measurement of membrane thickness: the thicknesses of various membrane samples are measured by using a micrometer (with an accuracy of 0.01 mm); and the thicknesses are measured at random 5 points on the sample and averaged.

Measurement of porosity: the membrane sample is immersed in n-butanol for 10 h, and then the porosity is calculated according to the formula:

$$P=(Mb/\rho b)/(Mb/\rho b+Mp/\rho p) \times 100\%$$

wherein $\rho b$ and $\rho p$ are the density of n-butanol and the dry density of cellulose; and Mb and Mp are the mass of n-butanol absorbed by the membrane sample and the mass of the fiber membrane itself, respectively.

Measurement of absorptive amount: the membrane sample is immersed in a electrolyte solution for 10 h so that the electrolyte solution in the membrane sample achieves saturation, and the mass of the membrane sample before and after absorbing the electrolyte solution was tested, respectively, and the absorptive amount was calculated according to the following formula:

$$EU=\{(W-Wo)/Wo\} \times 100\%$$

wherein Wo and W are the masses of the membrane samples before and after absorbing the electrolyte solution, respectively.

Measurement of average pore size: the pressure corresponding to the first opened pore is bubble point pressure, and the pore size corresponding to this pressure is the maximum pore size; during this process, the pressure and the flow rate are real-time recorded to obtain a pressure-flow curve; the pressure reflects the information about pore size, and the flow reflects the information about the number of the pores of certain pore size; then the pressure-flow rate curve of the dry membrane is tested, and the average pore size of the membrane sample can be calculated according to related formula. The relationship between pore size and pressure is represented by Washburn formula:

$$D=4\gamma \cos \theta /p$$

wherein D=pore diameter; $\gamma$=surface tension of liquid; $\theta$=contact angle and p=pressure difference.

Measurement of ion conductivity: the membrane sample was placed in an electrolyte solution at a temperature of 23±2° C., and immersed for 2 h while sealing. The electrolyte solution was injected into a mold for resistance test, and the mold was connected to a chemical station and test parameters were set. A layer of the membrane was introduced and its impedance spectrum was measured; and then another layer of the membrane was introduced and its impedance spectrum was measured, up to 4 layers of the membrane were introduced and four impedance spectrums were measured. The resistance values R1, R2, R3 and R4 for the 1, 2, 3 and 4 layers were read from the impedance spectrums respectively. A curve was drawn by using the number of layers as abscissa and the resistance of the membrane samples as ordinate; and the slope and linearity of the curve were calculated. When the linearity was greater than 0.99, the ion conductivity of the membrane sample was calculated according to the following formula:

$$\sigma=d/1000kS$$

wherein σ—the ion conductivity of the sample, in Siemens/meter (S/cm)

d—the thickness of the sample, in micrometers (μm)

k—the slope of the curve

S—the test area of the membrane sample, in square centimeters (cm$^2$).

Example 1

0.05 g of nano 5 A molecular sieve and 2 g of polyvinylidene fluoride were dissolved in acetone. The mixed solution was stirred thoroughly to form a uniform slurry. The slurry was coated on a PP base film to form a wet membrane. The wet membrane was dried at 90° C. for 15 min, and then the membrane was immersed in a lithium salt electrolyte solution of 1M LiPF$_{6+}$EC:DMC (1:1) in a dry environment for 30 sec and then taken out; and the liquid on the surface of the membrane was removed using a filter paper.

The concentration of the lithium salt electrolyte solution was 1 mol/L. In the lithium salt electrolyte solution, the solute is lithium hexafluorophosphate (LiPF$_6$), and the solvent is ethylene carbonate (EC) and dimethyl carbonate (DMC), which may also be abbreviated as LiPF$_6$/(EC+DMC), wherein EC+DMC represents a mixed solvent of ethylene carbonate and dimethyl carbonate (same in the following examples), and the volume ratio of EC to DMC was 1:1.

Example 2

0.02 g of nano 5 A molecular sieve and 2 g of poly (vinylidene fluoride-co-hexafluoropropylene) copolymer (P(VDF-HFP)) were dissolved in N-methylpyrrolidone (NMP). The mixed solution was stirred thoroughly to form a uniform slurry. The slurry was coated on a PE base film to form a wet membrane. The wet membrane was dried at 90° C. for 15 min, and then the membrane was immersed in a lithium salt electrolyte solution of 1M $LiPF_6$+EC:DMC (1:1) in a dry environment for 30 sec and then taken out; and the liquid on the surface of the membrane was removed using a filter paper.

Example 3

0.07 g of nano 5 A molecular sieve, 1 g of poly(vinylidene fluoride-co-hexafluoropropylene) copolymer (P(VDF-HFP)) and 1 g of polymethyl methacrylate (PMMA) were dissolved in N,N-dimethyl acetamide. The mixed solution was stirred thoroughly to form a uniform slurry. The slurry was coated on a PET base film to form a wet membrane. The wet membrane was dried at 90° C. for 15 min, and then the membrane was immersed in a lithium salt electrolyte solution of 1M $LiPF_6$+EC:DMC (1:1) in a dry environment for 30 sec and then taken out; and the liquid on the surface of the membrane was removed using a filter paper.

Example 4

0.05 g of nano 5 A molecular sieve, 0.5 g of poly(vinylidene fluoride-co-hexafluoropropylene) copolymer (P(VDF-HFP)) and 1.5 g of polymethyl methacrylate (PMMA) were dissolved in N,N-dimethyl acetamide. The mixed solution was stirred thoroughly to form a uniform slurry. The slurry was coated on a PET base film to form a wet membrane. The wet membrane was dried at 90° C. for 15 min, and then the membrane was immersed in a lithium salt electrolyte solution of 1M $LiPF_6$+EC:DMC (1:1) in a dry environment for 30 sec and then taken out; and the liquid on the surface of the membrane was removed using a filter paper.

Example 5

0.07 g of nano 5 A molecular sieve, 0.85 g of poly(vinylidene fluoride-co-hexafluoropropylene) copolymer (P(VDF-HFP)) and 1 g of polymethyl methacrylate (PMMA) were dissolved in N,N-dimethyl acetamide. The mixed solution was stirred thoroughly to form a uniform slurry. The slurry was coated on a PE base film to form a wet membrane. The wet membrane was dried at 90° C. for 15 min, and then the membrane was immersed in a lithium salt electrolyte solution of 1M $LiPF_6$+EC:DMC (1:1) in a dry environment for 30 sec and then taken out; and the liquid on the surface of the membrane was removed using a filter paper.

Example 6

0.02 g of nano 5 A molecular sieve, 3 g of poly(vinylidene fluoride-co-hexafluoropropylene) copolymer (P(VDF-HFP)) and 1 g of polymethyl methacrylate (PMMA) were dissolved in N,N-dimethyl acetamide. The mixed solution was stirred thoroughly to form a uniform slurry. The slurry was coated on a PE base film to form a wet membrane. The wet membrane was dried at 90° C. for 15 min, and then the membrane was immersed in a lithium salt electrolyte solution of 1M $LiPF_6$+EC:DMC (1:1) in a dry environment for 30 sec and then taken out; and the liquid on the surface of the membrane was removed using a filter paper.

Comparative Example 1

1 g of poly(vinylidene fluoride-co-hexafluoropropylene) copolymer (P(VDF-HFP)) was dissolved in N,N-dimethyl acetamide. The mixed solution was stirred thoroughly to form a uniform slurry. The slurry was coated on a PET base film to form a wet membrane. The wet membrane was dried at 90° C. for 15 min, and then the membrane was immersed in a lithium salt electrolyte solution of 1M $LiPF_6$+EC:DMC (1:1) in a dry environment for 30 sec and then taken out; and the liquid on the surface of the membrane was removed using a filter paper.

Comparative Example 2

0.5 g of poly(vinylidene fluoride-co-hexafluoropropylene) copolymer (P(VDF-HFP)) and 1.5 g of polymethyl methacrylate (PMMA) were dissolved in N,N-dimethyl acetamide. The mixed solution was stirred thoroughly to form a uniform slurry. The slurry was coated on a PET nonwoven fabric base film to form a wet membrane. The wet membrane was dried at 90° C. for 15 min, and then the membrane was immersed in a lithium salt electrolyte solution of 1M $LiPF_6$+EC:DMC (1:1) in a dry environment for 30 sec and then taken out; and the liquid on the surface of the membrane was removed using a filter paper.

Example 7

0.05 g of 10× molecular sieve, 0.5 g of poly(vinylidene fluoride-co-hexafluoropropylene) copolymer (P(VDF-HFP)) and 1.5 g of polymethyl methacrylate (PMMA) were dissolved in N,N-dimethyl acetamide. The mixed solution was stirred thoroughly to form a uniform slurry. The slurry was coated on a PET nonwoven fabric base film to form a wet membrane. The wet membrane was dried at 90° C. for 15 min, and then the membrane was immersed in a lithium salt electrolyte solution of 1M $LiPF_6$+EC:DMC (1:1) in a dry environment for 30 sec and then taken out; and the liquid on the surface of the membrane was removed using a filter paper.

Example 8

0.05 g of Y-type molecular sieve, 0.5 g of poly(vinylidene fluoride-co-hexafluoropropylene) copolymer (P(VDF-HFP)) and 1.5 g of polymethyl methacrylate (PMMA) were dissolved in N,N-dimethyl acetamide. The mixed solution was stirred thoroughly to form a uniform slurry. The slurry was coated on a PET nonwoven fabric base film to form a wet membrane. The wet membrane was dried at 90° C. for 15 min, and then the membrane was immersed in a lithium salt electrolyte solution of 1M $LiPF_6$+EC:DMC (1:1) in a dry environment for 30 sec and then taken out; and the liquid on the surface of the membrane was removed using a filter paper.

Example 9

0.05 g of nano 5 A molecular sieve, 0.5 g of poly(vinylidene fluoride-co-hexafluoropropylene) copolymer (P(VDF-HFP)) and 0.5 g of polymethyl methacrylate (PMMA) were dissolved in N,N-dimethyl acetamide. The mixed solution was stirred thoroughly to form a uniform slurry. The slurry was coated on a PET nonwoven fabric base film to form a wet membrane. The wet membrane was dried at 90° C. for 15 min, and then the membrane was immersed in a lithium salt electrolyte solution of 1M $LiPF_6$+ EC:DMC (1:1) in a dry environment for 30 sec and then taken out; and the liquid on the surface of the membrane was removed using a filter paper.

Example 10

0.05 g of nano 5 A molecular sieve, 2.0 g of poly (vinylidene fluoride-co-hexafluoropropylene) copolymer (P(VDF-HFP)) and 2.5 g of polymethyl methacrylate (PMMA) were dissolved in N,N-dimethyl acetamide. The mixed solution was stirred thoroughly to form a uniform slurry. The slurry was coated on a PET nonwoven fabric base film to form a wet membrane. The wet membrane was dried at 90° C. for 15 min, and then the membrane was immersed in a lithium salt electrolyte solution of 1M $LiPF_6$+ EC:DMC (1:1) in a dry environment for 30 sec and then taken out; and the liquid on the surface of the membrane was removed using a filter paper.

Example 11

0.125 g of nano 5 A molecular sieve, 0.5 g of poly (vinylidene fluoride-co-hexafluoropropylene) copolymer (P(VDF-HFP)) and 1.5 g of polymethyl methacrylate (PMMA) were dissolved in N,N-dimethyl acetamide. The mixed solution was stirred thoroughly to form a uniform slurry. The slurry was coated on a PET nonwoven fabric base film to form a wet membrane. The wet membrane was dried at 90° C. for 15 min, and then the membrane was immersed in a lithium salt electrolyte solution of 1M $LiPF_6$+ EC:DMC (1:1) in a dry environment for 30 sec and then taken out; and the liquid on the surface of the membrane was removed using a filter paper.

Example 12

0.008 g of nano 5 A molecular sieve, 0.5 g of poly (vinylidene fluoride-co-hexafluoropropylene) copolymer (P(VDF-HFP)) and 1.5 g of polymethyl methacrylate (PMMA) were dissolved in N,N-dimethyl acetamide. The mixed solution was stirred thoroughly to form a uniform slurry. The slurry was coated on a PET nonwoven fabric base film to form a wet membrane. The wet membrane was dried at 90° C. for 15 min, and then the membrane was immersed in a lithium salt electrolyte solution of 1M $LiPF_6$+ EC:DMC (1:1) in a dry environment for 30 sec and then taken out; and the liquid on the surface of the membrane was removed using a filter paper.

The basic properties and liquid absorption properties of the examples, comparative examples, and base films were shown in Table 1.

TABLE 1 physical and chemical properties of samples

| Cases | Thickness (dry) | Thickness (after absorbing liquid) | Porosity (%) | Average pore size (nm) | Liquid absorption (%) | Ion conductivity ($10^{-4} S cm^{-1}$) |
|---|---|---|---|---|---|---|
| PP base film | 15 | 15 | 42 | 32 | 240 | 1.2 |
| PE base film | 15 | 15 | 40 | 35 | 220 | 1.1 |
| PET nonwoven fabric film | 15 | 15 | 60 | 50 | 300 | 1.3 |
| Example 1 | 18 | 19 | 40 | 30 | 280 | 2.5 |
| Example 2 | 18 | 19 | 39 | 33 | 295 | 4.2 |
| Example 3 | 18 | 19 | 50 | 43 | 386 | 7.5 |
| Example 4 | 18 | 20 | 56 | 47 | 400 | 10.0 |
| Example 5 | 18 | 19 | 52 | 44 | 400 | 10.0 |
| Example 6 | 18 | 30 | 35 | 47 | 525 | 4.0 |
| Comparative example 1 | 17 | 18 | 56 | 48 | 330 | 1.3 |
| Comparative example 2 | 17 | 18 | 58 | 48 | 345 | 1.8 |
| Example 7 | 18 | 19 | 54 | 45 | 370 | 7.9 |
| Example 8 | 18 | 20 | 51 | 41 | 360 | 7.2 |
| Example 9 | 16 | 17 | 59 | 45 | 330 | 4.3 |
| Example 10 | 19 | 21 | 50 | 39 | 460 | 9.1 |
| Example 11 | 18 | 20 | 49 | 35 | 470 | 8.3 |
| Example 12 | 16 | 16 | 60 | 49 | 330 | 2.1 |

Note:
the liquid absorption (%) of the membrane sample = $(W - W_0)/W_0 \times 100$; W and $W_0$ are the weights of the membrane samples before and after absorbing liquid, respectively.

As can be seen from above results of physical and chemical properties, the polymer electrolyte membranes prepared in Examples 1-12 all have a high liquid absorption. In addition, the polymer electrolyte membranes with molecular sieve prepared in Examples 1-12 exhibit significantly improved ion conductivity, as compared with Comparative example 1-2, indicating that the addition of molecular sieve can significantly improve the ion conductivity of the polymer electrolyte membrane.

The above are only preferred examples of the invention and are not intended to limit the scope of the substantive technical content of the invention. The substantive technical content of the invention is broadly defined in the scope of the claims of the application. Any technical entity or method that is completed by others, if it is exactly the same as defined in the scope of the claims of the application, or an equivalent change, is considered to be within the scope of the claims.

What is claimed is:

1. A preparation method for a polymer electrolyte membrane, wherein the method comprises the steps of:
   (1) mixing a molecular sieve material, a polymer and a solvent to obtain a slurry, the molecular sieve material is one or more selected from the group consisting of nano 5A molecular sieve, 10× molecular sieve, and Y-type molecular sieve;
   wherein the nano 5A molecular sieve has a molecular formula of $Ca_{34}Na_{28}[(AlO_2)_{96}(SiO_2)_{96}] \cdot 216H_2O$, the 10×molecular sieve has a molecular formula of $Ca_{35}Na_{16}[AlO_2)_{86}(SiO_2)_{106}] \cdot 264H_2O$, the Y-type molecular sieve has a molecular formula of $Na_{56}[(AlO_2)_{56}(SiO_2)_{136}] \cdot 264H_2O$; wherein the weight ratio of the molecular sieve material to the polymer is 1:20 to 1:200; and wherein the polymer is selected from polyvinylidene fluoride (PVDF), poly(vinylidene fluoride-co-hexafluoropropylene) copolymer (P(VDF-HFP)), polymethyl methacrylate (PMMA), or a mixture thereof;
   (2) coating the slurry on a base film to form a wet membrane, the base film is selected from polyethylene film, polypropylene film, polyethylene terephthalate film or polyethylene terephthalate nonwoven fabric;
   (3) drying the wet membrane to obtain a dry membrane; and
   (4) immersing the dry membrane in a lithium salt electrolyte solution, and taking out to obtain a polymer electrolyte membrane.

2. The preparation method according to claim 1, wherein the molecular sieve material is present in an amount of 0.1-3.3 wt % based on the total weight of the slurry obtained in the step (1).

3. The preparation method according to claim 1, wherein the polymer is a mixture of poly(vinylidene fluoride-co-hexafluoropropylene) copolymer (P(VDF-HFP)) and polymethyl methacrylate (PMMA), wherein the weight ratio of polyvinylidene fluoride and hexafluoropropylene copolymer:polymethyl methacrylate is 1:0.1 to 1:5.

4. The preparation method according to claim 1, wherein the solvent is one or more selected from the group consisting of acetone, N-methyl-2-pyrrolidone, N,N-dimethylformamide, N,N-dimethyl acetamide, dimethyl sulfoxide, ethanol, and isopropanol.

5. The preparation method according to claim 1, wherein the concentration of the lithium salt solute in the lithium salt electrolyte solution is 0.5-1.5 mol/L.

6. A polymer electrolyte membrane, wherein the polymer electrolyte membrane comprises a base film layer and a coating layer, the coating layer comprises a molecular sieve material, a polymer, and a lithium salt electrolyte solution, wherein the molecular sieve material is one or more selected from the group consisting of nano 5A molecular sieve, 10×molecular sieve, and Y-type molecular sieve;
   wherein the nano 5A molecular sieve has a molecular formula of $Ca_{34}Na_{28}[(AlO_2)_{96}(SiO_2)_{96}] \cdot 216H_2O$, the 10×molecular sieve has a molecular formula of $Ca_{35}Na_{16}[AlO_2)_{86}(SiO_2)_{106}] \cdot 264H_2O$, the Y-type molecular sieve has a molecular formula of $Na_{56}[(AlO_2)_{56}(SiO_2)_{136}] \cdot 264H_2O$; wherein the weight ratio of the molecular sieve material to the polymer is 1:20 to 1:200; wherein the polymer is selected from polyvinylidene fluoride (PVDF), poly(vinylidene fluoride-co-hexafluoropropylene) copolymer (P(VDF-HFP)), polymethyl methacrylate (PMMA), or a mixture thereof;
   and the base film is selected from polyethylene film, polypropylene film, polyethylene terephthalate film or polyethylene terephthalate nonwoven fabric.

* * * * *